Jan. 14, 1958    N. W. PARKER ET AL    2,820,091

COLOR TELEVISION, FREQUENCY CONTROL SYSTEM

Filed Jan. 30, 1952    3 Sheets-Sheet 1

INVENTORS
Norman W. Parker
Bernard S. Parmet
BY Foorman L. Mueller
Atty.

COLOR TELEVISION, FREQUENCY CONTROL SYSTEM

Filed Jan. 30, 1952 3 Sheets-Sheet 2

INVENTORS
Norman W. Parker
Bernard S. Parmet
BY
Foorman L. Mueller
Atty.

COLOR TELEVISION, FREQUENCY CONTROL SYSTEM

Filed Jan. 30, 1952 3 Sheets-Sheet 3

INVENTORS
Norman W. Parker
Bernard S. Parmet
BY Foorman L. Mueller
Atty.

United States Patent Office 2,820,091
Patented Jan. 14, 1958

2,820,091

COLOR TELEVISION, FREQUENCY CONTROL SYSTEM

Norman W. Parker, Park Forest, and Bernard S. Parmet, Chicago, Ill., assignors to Motorola, Inc., Chicago, Ill., a corporation of Illinois Application January 30, 1952, Serial No. 269,078

12 Claims. (Cl. 178—5.4)

This invention relates to color television systems, and more particularly to the synchronization of colors in such a system.

Various color television systems have been proposed, in some of which color synchronizing or sampling carrier waves are transmitted as a part of the video signal for controlling the color at the television receiver. It has been proposed to use a color controlling frequency of 3.898 megacycles which is 247½ times the horizontal line frequency of 15,750 cycles per second. This wave is transmitted as bursts following each horizontal synchronization pulse and is used to synchronize both the frequency and phase of a color controlling oscillator at the receiver.

The video signal is modulated on a carrier wave for transmission to the receiving stations, and the accompanying sound signal is modulated on a second carrier wave which is transmitted simultaneously. The frequencies of the video and audio carrier waves for each channel are fixed by Federal Communication Commission rules and differ for each channel by 4.5 megacycles. This difference in frequency is utilized in many receivers for obtaining the audio wave in what is generally referred to as an intercarrier sound system.

Difficulties have been encountered in building receivers for use with the color television system as proposed in that the color controlling wave bursts, following the horizontal synchronization pulses and provided on the horizontal blanking pedestal, interfere with the horizontal scanning systems. This is because such scanning systems generally include some form of automatic frequency control arrangement and the color controlling wave burst affects this control. Further, synchronization of the color controlling oscillator at the receiver by the short intermittent color wave bursts has been difficult to achieve and has resulted in quite complicated equipment.

In the proposed color television system, an arrangement of color phase alternation has been provided for reversing the color vectors in alternate fields to provide improved color reproduction. For this system it is necessary to provide means for indicating the even and odd fields of the television picture. Although the standard video signal is slightly different in alternate fields, because of the half-line relation, it is difficult to detect the individual fields from this slight difference in the video signal.

It is therefore an object of the present invention to provide an improved synchronization system for use in television receivers which provide colored pictures.

A further object of this invention is to provide a synchronization system for color television in which the color controlling wave is controlled in frequency from the inter-carrier wave, and the phase of the color controlling wave is synchronized by controlling wave bursts included as part of the video signal.

Another object of this invention is to provide a color television system wherein the composite video signal includes portions which facilitate detection of odd and even fields.

Still another object of this invention is to provide a video signal for color television including bursts of a wave during each field blanking period for controlling the phase of a color controlling wave at the receiver and for providing an indication of alternate fields of the picture.

A feature of this invention is the provision of a color controlling system for color television broadcasting wherein the sound carrier is derived from the video carrier and a color controlling wave in the transmitter, and the color controlling wave is developed in the receiver from the sound and video carriers and is synchronized in phase by bursts of the color controlling wave included as part of the video signal. A further feature of this invention is the provision of a color television receiver including an oscillator which is synchronized by the intercarrier sound wave, with the oscillator frequency being reduced by a predetermined ratio to the frequency of a color controlling wave, and being held in phase by bursts of the color controlling wave. The bursts may be provided once per picture line, or once per picture field, being preferably provided only once per field.

Another feature of this invention is the provision of a system for producing a video signal including bursts of a controlling wave during each field, with the bursts in alternate fields being out of phase to facilitate detection of the alternate fields at the receiver.

Further objects, features, and the attending advantages of the invention will be apparent from a consideration of the following description when taken in connection with the accompanying drawings, in which.

Figure 3:
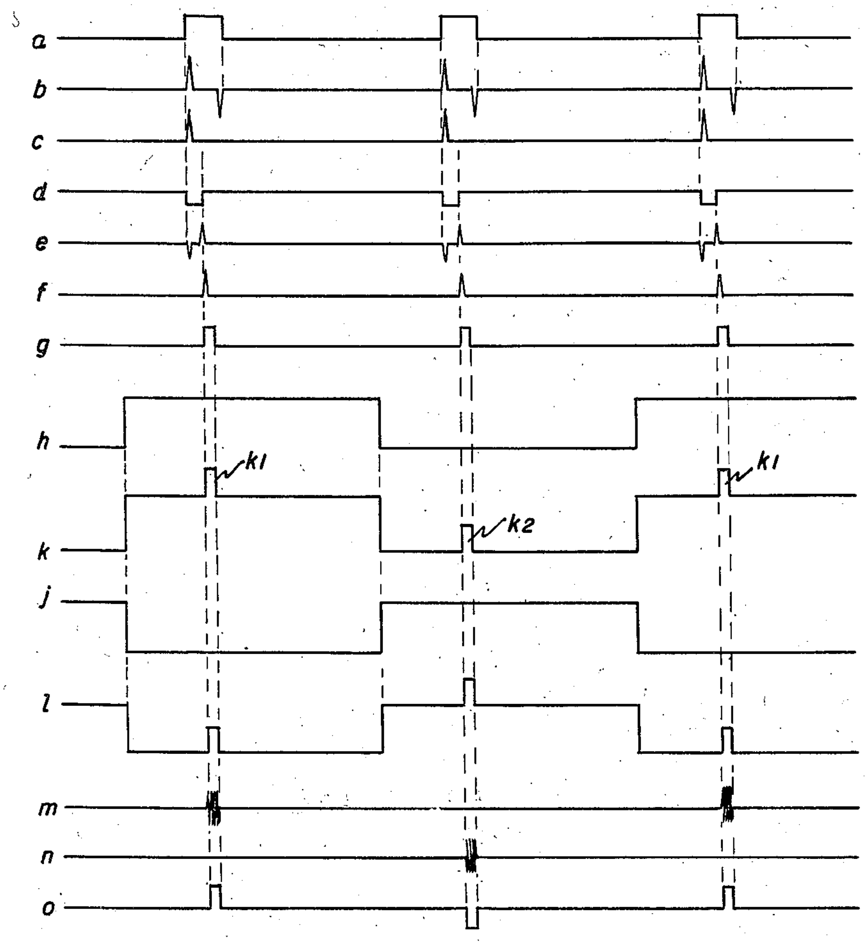
Figure 4:
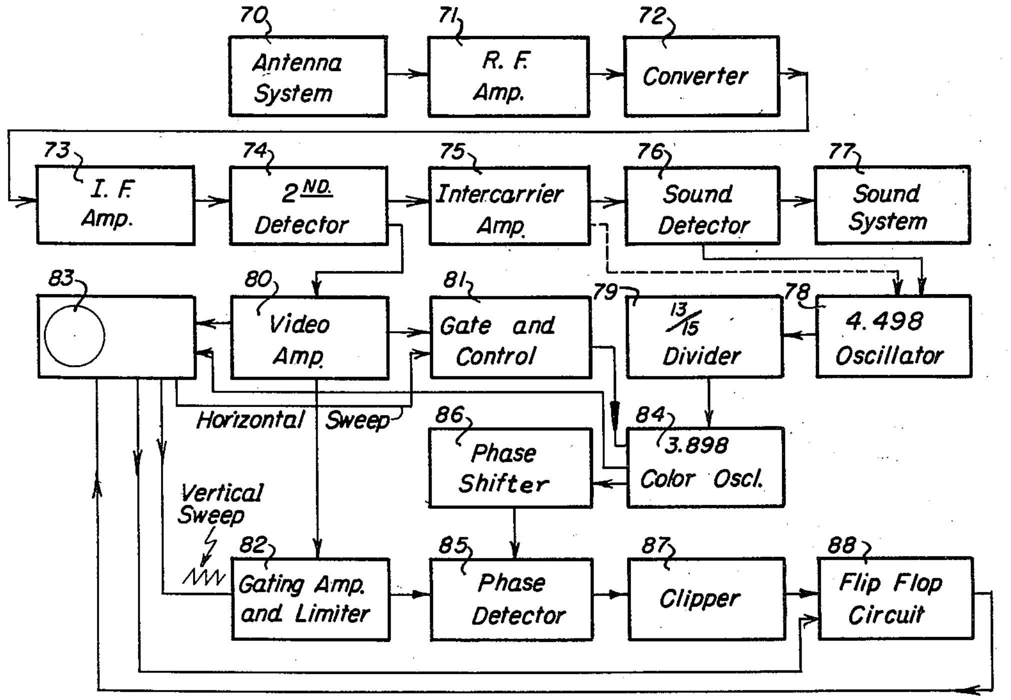
Figure 5:
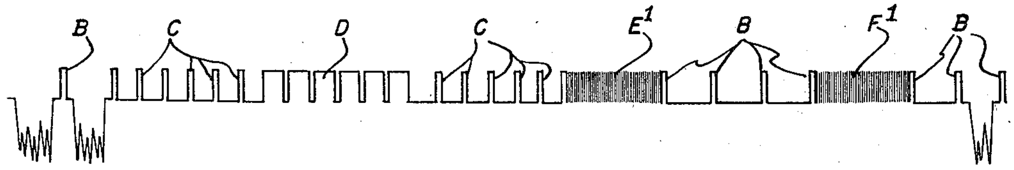

Fig. 3 includes curves illustrating operation of the system in accordance with the invention;

Fig. 4 is a block diagram of a receiver in accordance with the invention;

Fig. 5 illustrates another video signal with which the system may be used.

In practicing the invention there is provided a color television system including a transmitter for transmitting a first carrier wave modulated by a video signal and a second carrier wave modulated by an audio signal. The video signal includes picture elements and synchronizing elements for synchronizing the lines, fields, and colors of the television picture. The frequencies of the video and audio carrier waves may be so related to each other and to the color controlling wave that a wave of the frequency of the color controlling wave can be derived from the two carrier waves. This relationship is established by deriving the sound carrier wave from the picture carrier wave and the color controlling wave in combination at the transmitter. Bursts of the color controlling wave are also applied as color synchronizing elements to the video signal. These bursts may be applied once per line, or only once per field during the vertical blanking period. Certain of the bursts may be of opposite phase in alternate fields to facilitate recognition of the alternate fields.

The receiver includes means for deriving the video and sound carriers and for heterodyning the same to produce an intercarrier sound wave. An oscillator at the frequency of the intercarrier sound wave is synchronized by the received wave and the output thereof is divided in frequency to produce the color controlling wave. This color controlling wave is then synchronized in phase from the bursts of the color controlling wave transmitted as part of the video signal. The out-of-phase bursts of the color controlling wave may be derived from the video signal and applied to a phase detector for providing a control indicating whether an odd or even field is being received to control the color phase alternation system.

In this system, the intercarrier sound wave must be so related to the color controlling wave that frequency conversion is easily accomplished and this may be provided by use of an intercarrier wave of the order of 4.5 megacycles and a color controlling wave of the order of 3.9 megacycles so that the relation therebetween is 15 to 13. The system disclosed is not limited to such values but these values are in accordance with present television broadcasting standards and illustrate one specific embodiment of the invention. As the color controlling wave is established in the receiver from the intercarrier wave, it need be synchronized only intermittently and once per field is satisfactory. Theoretically phase synchronization of the wave is required only once for each transmission, but it is desirable to have the phase information available at all times. This permits synchronization to be re-established in the event the signal fails, for example. Synchronizing only once per field has the advantage that it permits the positioning of the bursts of the color controlling wave in the video signal at points where no interference is caused with standard television receiver components. This renders the system more compatible.

Figure 1:
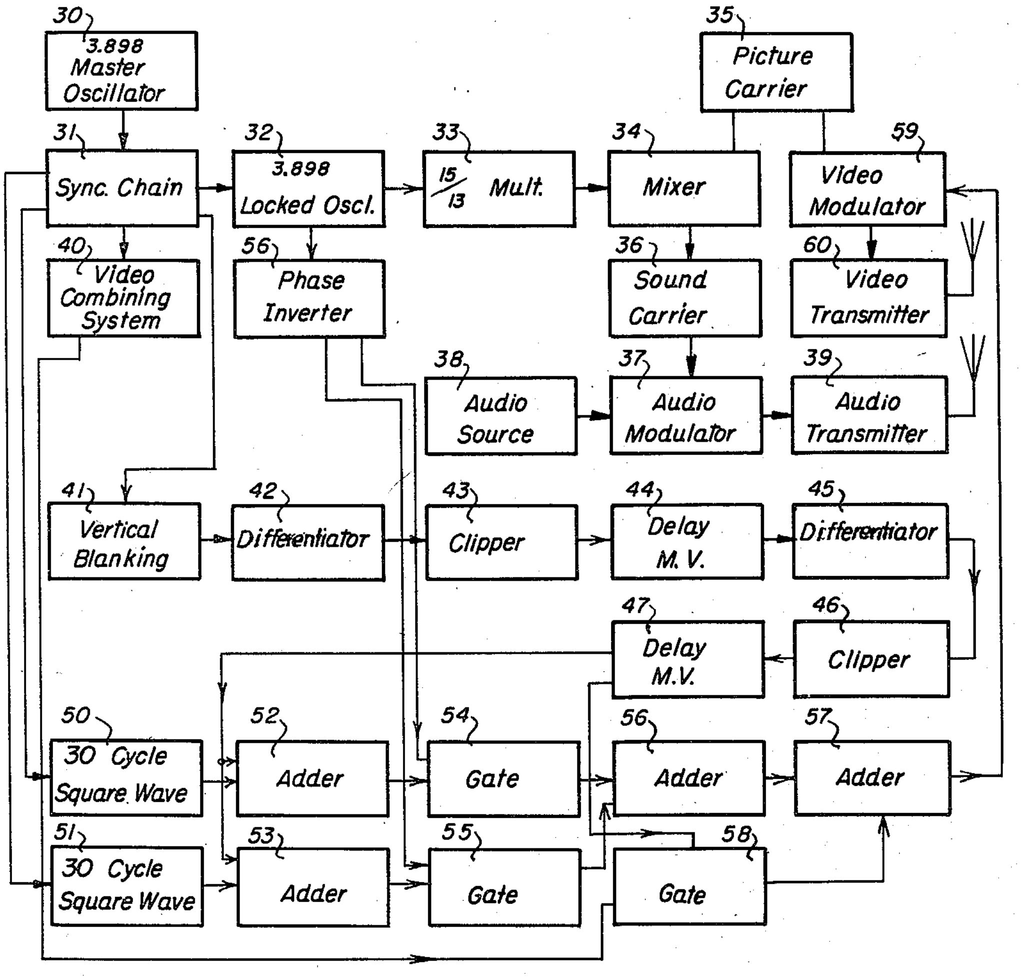
Fig. 1 is a block diagram of a transmitter in accordance with the invention.

Referring now to the drawings, in Fig. 1 there is illustrated in block diagram form a television transmitter for providing television signals in accordance with the invention. In this system a master oscillator 30 produces the color controlling wave having a frequency of 3.898 megacycles. This must be a relatively accurate oscillator, a crystal controlled oscillator being preferable. The frequency of the oscillator 30 is converted by the synchronization chain 31 so that the line and field synchronization pulses are derived therefrom and the entire synchronization signal is formed. As previously stated, the color controlling wave is directly related in frequency to the line synchronization pulse frequency (repetition rate), being 247.5 times the line frequency. The synchronization signal produced by the chain 31 may include bursts of the color controlling wave following each horizontal synchronization pulse, as previously mentioned, or may include bursts only during the field blanking interval.

The output of the synchronization chain is applied to an oscillator 32 which has a natural response at the frequency of the color controlling wave and which is locked in frequency with this portion of the synchronization signal. This oscillator may not be necessary in systems in which the master oscillator 30 is physically positioned so that its output is available for combining with the picture carrier wave. The output of the oscillator 32 is multiplied in the frequency multiplier stage 33 to produce the intercarrier frequency. When using a color controlling frequency of 3.898 megacycles and a multiplication of 15/13, the intercarrier frequency obtained is approximately 4.498 megacycles. The intercarrier wave is applied to the mixer 34 to which the picture carrier obtained from the generator 35 is also applied. These two waves are combined to provide the sound carrier which has a frequency greater than the frequency of the picture carrier by the intercarrier frequency. The combined wave provides the sound carrier at 36, which is modulated at 37 by audio waves from the source 38, with the modulated carrier wave being transmitted by the transmitter 39. This arrangement for producing the sound carrier insures the relationship between the picture and sound carriers which permits use of the intercarrier wave to facilitate providing the color controlling wave at the receiver.

Figure 2:
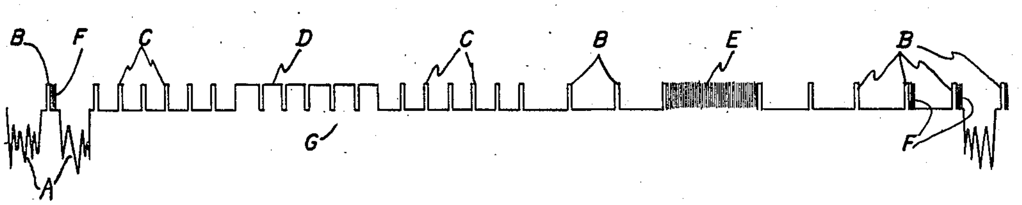
Fig. 2 illustrates the video signal produced by the transmitter of Fig. 1.

The synchronization elements of the signal are combined with the picture elements in the video combining system 40. Before applying the signal to the video modulator, however, it may be modified by the addition of bursts of the wave from the oscillator 32 (or 30) for each field. This is illustrated by Fig. 2 which shows a portion of the video signal including picture elements A, horizontal synchronizing pulses B, equalizer pulses C, a serrated vertical pulse D, and the color wave burst E and F. The equalizer pulses C, vertical pulse D, a plurality of horizontal pulses B following the vertical pulse, and the color burst E are provided on a vertical pedestal G. The bursts of the color controlling wave E, which are of opposite phase in alternate fields for identifying the fields, may be provided during this latter period for the duration of two horizontal pulse intervals, for example. The color bursts F, for phasing the color wave developed in the receiver are illustrated as positioned following the horizontal pulses. These may be provided in a known manner.

The manner of providing a wave having field identifying bursts E, as shown in Fig. 2, is illustrated in Fig. 3. The vertical blanking wave, as illustrated by curve *a* in Fig. 3, is derived from the synchronization chain 31, as represented by the block 41. This wave is differentiated in the differentiator 42 to produce positive and negative pulses at the leading and lagging edges, respectively, of the blanking wave, as shown by curve *b* (Fig. 3). This wave passes through clipper 43 to remove the negative pulses and thereby leave only the positive pulses as shown by curve *c*. These positive pulses are used to trigger the delay multi-vibrator 44 which produces negative pulses of a predetermined duration as indicated by the curve *d*. The pulses of curve *d* have such a duration to space the color bursts with respect to the beginning of the vertical pedestal.

The pulse wave *d* is differentiated in the differentiator 45 to provide negative and positive pulses at the leading and lagging edges, respectively, as shown by curve *e*. This wave is passed through clipper 46 to remove the negative pulses and provide the positive pulse wave *f*. This pulse wave is used to trigger the second delay multivibrator 47 which produces the pulse wave *g* including pulses of the duration required for the color bursts.

Square waves of field frequency are available from the synchronization chain 31, and such waves of opposite polarity are applied to the system as indicated at 50 and 51. The wave applied at 50 is a 30 cycle square wave as shown by curve *h*, Fig. 3, and the wave at 51 is a wave of opposite polarity as shown at *j* of Fig. 3. These waves are applied respectively to adders 52 and 53 which combine the square waves with the pulse wave of the multivibrator 47. This is illustrated by curves *k* and *l* respectively, the curve *k* showing the combination of curves *g* and *h*, and the curve *l* showing the combination of curves *g* and *j*. These combined waves are applied from the adders 52 and 53 to the gates 54 and 55 respectively. Also applied to these gates is the wave from the locked oscillator 32, which has been passed through phase inverter 56 so that waves of opposite phase are applied to the two gates. The gates are so arranged that waves from the oscillator 32 are passed only when the pulses are superimposed. That is, the wave from the oscillator 32 is passed by the gate 54 only during the pulses $k_1$. The pulses $k_2$ at alternate fields do not reach sufficient amplitude to open the gate. Therefore, the output wave of gate 54 will be as shown by curve *m*. Similarly the gate 55 will open only on alternate fields to produce a wave as shown by curve *n*. Since the waves from the oscillator 32 are applied to the gates 54 and 55 reversed in phase, the bursts *m* and *n* will be of opposite phase.

To apply the burst waves *m* and *n* to the composite video signal, they are combined in adder 56 and applied to adder 57. Also applied to the adder 57 is the composite video signal which has been passed through gate 58. The gate 58 is controlled by the output of the delay multi-vibrator 47 which produces the pulse wave *g*. The composite signal, therefore, has portions gated out for each field and the adder 57 applies the bursts from waves *m* and *n* to the video signal at these points. The composite signal is then applied to the video modulator 59 and transmitted by the video transmitter 60.

In Fig. 4 there is illustrated in block diagram form the receiver in accordance with the invention. The receiver includes an antenna system 70, radio frequency amplifier 71, converter 72, intermediate frequency amplifier 73 and second detector 74, which may all be of standard construction. The second detector 74 produces both the intercarrier sound signal and the composite video signal. The composite video signal is applied to the video amplifier 80 and then in turn to the picture reproducing device 83. The intercarrier sound signal is amplified in the amplifier 75, and applied to sound detector 76 which derives the audio signal and applies it to the sound system 77. The detector 76 serves as a ratio detector for deriving sound waves, and may also serve as a phase detector for producing a control voltage for controlling an oscillator 78, the natural frequency of which is equal to the frequency of the intercarrier wave. Alternatively the oscillator may operate directly from the intercarrier wave from amplifier 75, as indicated in dotted lines.

The wave from the oscillator 78 is applied to a frequency divider 79 which reduces the wave to the frequency of the color controlling wave. As the color controlling wave was multiplied by a factor N (15/13) in the transmitter to produce the intercarrier wave, the intercarrier must be divided by this factor N, or multiplied by one over N (13/15) in the receiver to produce the color controlling wave. The divider 79 provides this operation. The wave from the divider 79 is controlled in phase by the gate and control unit 81 which receives the video signal from the video amplifier 80. The gate portion of the unit 81 is controlled by a wave developed by the horizontal sweep system to gate out the bursts F from each line in a system operating with a signal as illustrated in Fig. 2. This derives the controlling wave bursts from the video signal for controlling the phase of the color subcarrier wave in the receiver so that the colors appear in the proper sequence and time relationship. As previously stated, and as will be further explained, a single burst for each transmission is adequate for controlling the phase, and it may be desirable to provide a burst only once for each field.

The gating amplifier 82 is controlled by the vertical scanning wave which is available in the reproducing device 83 so that only the bursts E of the video signal (Fig. 2) are passed. The output of the gating amplifier 82 is applied to a phase detector 85, to which the output of the oscillator 84 is applied through the phase shift unit 86. The wave from oscillator 84 may be shifted in phase by 45° to thereby be combined with the alternate out-of-phase signals from the gating amplifier 82 to provide positive pulses at one field and negative pulses at alternate fields. This is illustrated by curve *o* of Fig. 3. This pulse wave is applied to clipper 87 which eliminates the negative pulses and applies the positive pulses to the flip flop circuit 88. The vertical retrace pulses may also be applied to the flip flop circuit 88 from the picture reproducing device 83, to restore the flip flop circuit at the end of each field. The output of the flip flop circuit 88 therefore provides indications of even or alternate fields for controlling the color phase alternation equipment of the picture reproducing device 83. It will be apparent that the flip flop circuit 88 may also be used to gate out the bursts from alternate fields so that bursts of only one polarity are applied to the phase control system 81, if this is desired.

It will be apparent that in order to obtain the proper color control wave, there must be a predetermined relation between the frequencies of the intercarrier wave and the color control wave. Further, for the system to be feasible, the relationship must be simple so that it is easy to obtain a color control wave from the intercarrier wave. In systems which have been proposed, the color controlling wave has a frequency of 3,898,125 cycles and by using 13/15 ratio the intercarrier wave must have a frequency of 4,497,836 cycles. The intercarrier frequency generally used is 4.5 megacycles, but the tolerances permitted are such that it would be permissible to change the frequency by 2164 cycles as required to conform to the above relationship.

The system for obtaining indications of alternate fields has many advantages over systems which operate merely from the differences in the relation of the horizontal and vertical pulses in alternate fields. In the first place, the gating action provided is effective to reduce noise to a great extent. Noise is further reduced because of the tuned circuits in the phase detector. The output of the phase detector is of low frequency and high frequency disturbances can be filtered out to further improve operation.

It is to be pointed out that the systems for providing color synchronization and field identification, although cooperating together in an advantageous manner, may also be used independently of each other. For example, the color control system may be used with a video signal as illustrated in Fig. 5 wherein the color phasing bursts are provided only once per field during the vertical blanking period. The signal of Fig. 5 is similar to the signal of Fig. 2, except the field identifying bursts $E^1$ are immediately following the post equalizer pulses C, and the color phasing bursts $F^1$ are also provided in the vertical blanking period, instead of being once per line with the horizontal synchronization pulses. It is to be pointed out that the relative positions of the bursts $E^1$ and $F^1$ during the vertical blanking period may be changed as may be desired. In a system operating with such a signal, the transmitter must provide the bursts $E^1$ which are of opposite phase in alternate fields and the bursts $F^1$ which provide the proper color controlling wave phase in all fields. At the receiver it is necessary to gate out the two bursts $E^1$ and $F^1$ separately which may be accomplished by using the waves from the vertical deflection system. The bursts $E^1$ are passed by the gate of the field identifying system (82, Fig. 4) and the bursts $F^1$ are passed by the gate of the color wave phasing system (81, Fig. 4). Therefore, it is seen that the system for providing color synchronization can be used with the signal providing bursts only during the field blanking period. The system does require, however, that a definite relation be established between the audio intercarrier wave frequency and the color control wave frequency as has been described in connection with Fig. 1. This system still has the advantage that the color controlling wave is controlled in frequency from the intercarrier wave and need be controlled only in phase by the bursts in the video signal. This makes for much easier synchronization of the color carrier wave.

The system of field recognition disclosed may also be used independently and may even be used when the color controlling bursts are provided each line or each field. The wave from which the field recognizing bursts are derived is available at the transmitter and by phasing and gating can be relatively easily applied to the video signal, so that field recognition can be obtained from the phase of the bursts during the field blanking period.

Although one embodiment of the invention has been described which is illustrative thereof, it is obvious that various changes and modifications can be made therein without departing from the intended scope of the invention as defined in the appended claims. The various components shown in block diagram may be of any suitable standard construction.

We claim:

1. In a color television system wherein color pictures and accompanying sound are transmitted by first and second carrier waves modulated by video and audio signals respectively, with the video signal comprising picture elements and synchronizing elements including line and field synchronizing pulses and color controlling wave portions having predetermined frequency and phase, the combination, including transmitting means including means for generating said first carrier wave, means for generating a color controlling wave, means for multiplying the frequency of said color controlling wave by a factor "n" to produce a third wave of higher frequency than said color controlling wave, means for mixing said first carrier wave and said third wave to produce the second carrier wave, means for producing a composite video signal including portions of said color controlling wave, means for modulating said first carrier wave by said composite video signal, means for modulating said second carrier wave by audio signals, and means for transmitting said first and second carrier waves, and receiving means for receiving said first and second carrier waves, said receiving means including means for deriving said composite video signal including said color controlling wave portions from said first carrier wave and for producing an intercarrier wave having a frequency equal to the difference of said first and second carrier waves, means for deriving said audio signals from said intercarrier wave, oscillator means having a frequency of the order of the frequency of said intercarrier wave, means for synchronizing said oscillator means with said intercarrier wave, means for dividing the wave from said oscillator by said factor "n" to produce a wave having the frequency of said color controlling wave, means for deriving color controlling wave portions from said video signal, and means for synchronizing said produced wave with said color controlling wave portion of said video signal for controlling the phase thereof.

2. In a color television system wherein color pictures and accompanying sound are transmitted by first and second carrier waves modulated by video and audio signals respectively, with the video signals having picture elements and synchronizing elements including line and field synchronizing pulses and color controlling wave portions having predetermined frequency and phase, the combination including, transmitting means including means for generating said first carrier wave, means for generating a color controlling wave, means for multiplying the frequency of said color controlling wave by a factor "n" to produce a third wave of higher frequency than said color controlling wave, means for mixing said first carrier wave and said third wave to produce said second carrier wave, means for producing a composite video signal including a portion of said color controlling wave for each field of the picture, means for modulating said first carrier wave by said composite video signal, means for modulating said second carrier wave by audio signals, and means for transmitting said first and second carrier waves, and receiving means for receiving said first and second carrier waves, said receiving means including means for deriving said video modulating signal including said color controlling wave portions from said first carrier wave and for producing an intercarrier wave having a frequency equal to the difference of said first and second carrier waves, means for deriving said audio signals from said intercarrier wave, means producing oscillations having a frequency of the order of the frequency of said intercarrier wave and synchronized with said received intercarrier wave, means for dividing the wave of said oscillators by said factor "n" to produce a wave having the frequency of said color controlling wave, gating means for deriving said color controlling wave portions from said received video signal, and means for synchronizing said produced wave with said derived color controlling wave portions for controlling the phase thereof.

3. In a color television system wherein color pictures and accompanying sound are transmitted by first and second carrier waves modulated by video and audio signals respectively, with the video signals including synchronizing elements having wave portions of predetermined frequency and phase for controlling the color, the combination including, transmitting means including means for generating said first carrier wave, means for generating color controlling wave, means for multiplying the frequency of said color controlling wave by a factor "n" to produce a third wave of higher frequency than said color controlling wave, means for mixing said first carrier wave and said third wave to produce said second carrier wave, means for producing a composite video signal including bursts of said color controlling wave with portions of the bursts being of opposite phase in alternate fields, means for modulating said first carrier wave by said composite video signal, and means for transmitting said first and second carrier waves, and receiving means for receiving said first and second carrier waves, said receiving means including means for deriving said composite video signal including said color controlling wave bursts from said first carrier wave and for producing an intercarrier wave having a frequency equal to the difference of said first and second carrier waves, means for dividing said intercarrier wave by said factor "n" to produce a wave having the frequency of said color controlling wave, means for synchronizing said produced wave with said color controlling wave bursts of said video signal for controlling the phase thereof, and means for identifying alternate fields by said opposite phase controlling wave bursts.

4. In a color television system wherein color pictures and accompanying sound are transmitted by first and second carrier waves modulated by video and audio signals respectively, with the video signals having synchronizing portions including wave portions of predetermined frequency and phase for controlling the color, the combination including, transmitting means including means for generating said first carrier wave, means for generating a color controlling wave having a frequency of the order of 3.9 megacycles, means for multiplying the frequency of said color controlling wave by 15/13 to produce a third wave having a frequency of the order of 4.5 megacycles, means for mixing said first carrier wave and said third wave to produce said second carrier wave, means for producing a composite video signal including portions of said color controlling wave, means for modulating said first carrier wave by said composite video signal and means for transmitting said first and second carrier waves, and means for receiving said first and second carrier waves, said receiving means including means for deriving said video modulating signal including said color controlling wave portions from said first carrier wave and for producing an intercarrier wave having a frequency of the order of 4.5 megacycles, means for dividing said intercarrier wave by 15/13 to produce a wave having a frequency of the order of 3.9 megacycles, and means for synchronizing said produced wave with said color controlling wave portion of said video signal for controlling the phase thereof.

5. In a color television system wherein color pictures and accompanying sound are transmitted by first and second carrier waves modulated by video and audio signals respectively, with the video signals having picture elements interspersed with synchronizing elements, said synchronizing elements including line and field synchronizing pulses and color synchronizing portions having predetermined frequency and phase, the combination including, transmitting means including means for generating said first carrier wave, means for generating a color controlling wave, means for multiplying the frequency of said color controlling wave by a factor "n" to produce a third wave of higher frequency than said color controlling wave, means for mixing said first carrier wave and said third wave to produce said second carrier wave, means for producing a composite video signal including picture elements and synchronization elements with a burst of said color controlling wave being provided for each field following the synchronization pulse for the field, means for modulating said first carrier wave by said composite video signal, and means for transmitting said first and second carrier waves, and means for receiving said first and second carrier waves, said receiving means including means for deriving said video modulating signal including said color controlling wave portions from said first carrier wave and for producing an intercarrier wave having a frequency equal to the difference of said first and second carrier waves, means for dividing said intercarrier wave by said factor "n" to produce a wave having the frequency of said color controlling wave, gating means for separating said bursts of said color controlling wave from said received video signal, and means for synchronizing said produced wave with said color controlling wave bursts for controlling the phase thereof.

6. In a color television system wherein color pictures and accompanying sound are transmitted by first and second carrier waves modulated by video and audio signals respectively, with the video signals having picture elements interspersed with synchronizing elements, said synchronizing elements including line and field synchronizing pulses and color synchronizing portions having predetermined frequency and phase, the combination including, transmitting means including means for generating said first carrier wave, means for generating a color controlling wave, means for multiplying the frequency of said color controlling wave by a factor "n" to produce a third wave of higher frequency than said color controlling wave, means for mixing said first carrier wave and said third wave to produce said second carrier wave, means for producing a composite video signal including picture elements and synchronization elements with a burst of said color controlling wave being provided for each line following the synchronization pulse for the line, means for modulating said first carrier wave by said composite video signal, and means for transmitting said first and second carrier waves, and means for receiving said first and second carrier waves, said receiving means including means for deriving said video modulating signal including said color controlling wave portions from said first carrier wave and for producing an intercarrier wave having a frequency equal to the difference of said first and second carrier waves, means for dividing said intercarrier wave by said factor "n" to produce a wave having the frequency of said color controlling wave, gating means for separating said bursts of said color controlling wave from said received video signal, and means for synchronizing said produced wave with said color controlling wave bursts for controlling the phase thereof.

7. A color television receiver for reproducing color pictures and accompanying sound transmitted on first and second carrier waves modulated by video and audio signals respectively, said video signals having synchronizing elements including synchronizing pulses and wave portions following said synchronizing pulses having predetermined frequency and phase of controlling color reproduction, and with said first and second carrier waves differing in frequency by a predetermined factor $n$ bearing a fixed frequency relation to said wave portions of predetermined frequency, said receiver including detector means for deriving said audio and video signals including said wave portions for controlling color and for heterodyning said first and second carrier waves to produce an inter-carrier wave equal to the difference frequency of said waves, frequency changing means coupled to said detector means for dividing said intercarrier wave by the factor $n$ to render said inter-carrier wave a resultant wave equal in frequency to that of said wave portions, gating means coupled to said detector means to derive said wave portions for controlling color from said video signals, reproducing means coupled to said detector means to utilize said video and audio signals, and means coupled to said frequency changing means and to said gating means to synchronize the phase of said resultant wave with said wave portions for controlling color to produce a signal at said reproducing means for controlling the color reproduction thereof.

8. A color television receiver for reproducing color pictures and accompanying sound transmitted on first and second carrier waves modulated by video and audio signals respectively, said video signals having synchronizing elements including line and field synchronizing pulses and wave portions following each line synchronizing pulse having predetermined frequency and phase for controlling color reproduction, and with said first and second carrier waves differing in frequency by a predetermined factor $n$ bearing a fixed frequency relation to said wave portions of predetermined frequency, said receiver including detector means for deriving said audio and video signals including said wave portions for controlling color and for heterodyning said first and second carrier waves to produce an inter-carrier wave equal to the difference frequency of said waves, frequency changing means coupled to said detector means for dividing said intercarrier wave by the factor $n$ to render said intercarrier wave a resultant wave equal in frequency to that of said wave portions, gating means coupled to said detector means to derive said wave portions for controlling color from said video signals, reproducing means coupled to said detector means to utilize said video and audio signals, and means coupled to said frequency changing means and to said gating means and to said reproducing means to synchronize the phase of said resultant wave and said wave portion for controlling color to produce a signal at said reproducing means for controlling the color reproduction thereof.

9. A color television transmitter for producing waves representing color pictures and accompanying sound including in combination, signal source means for supplying a first carrier wave, oscillator means for generating a color controlling wave, multiplier means coupled to said oscillator means for increasing the frequency of said color controlling wave by a predetermined amount to produce a third wave of higher frequency, mixing means coupled to said multiplier means and said signal source means to combine said first carrier wave and said third wave to produce a second carrier wave related in frequency to said color controlling wave, a source of composite video signals including picture elements and line and field synchronizing elements interspersed therewith, gating means coupled to said source of composite video signals and to said oscillator means to incorporate portions of said color controlling wave with selected ones of said synchronizing elements, first modulator means coupled to said gating means and said signal source means to modulate said first carrier wave by said video signals, second modulator means coupled to said mixing means to modulate said second carrier waves by sound signals and means for transmitting said first and second carrier waves.

10. A color television transmitter for producing waves representing color pictures and accompanying sound including in combination, means for generating a first carrier wave, means for generating a color controlling wave, means for multiplying the frequency of said color controlling wave by a predetermined factor to produce a third wave of higher frequency, means for mixing said first carrier wave and said third wave to produce a second carrier wave, means for producing a composite video signal including portions of said color controlling wave, means for modulating said first carrier wave by said composite video signal, means for modulating said second carrier wave by audio signals, and means for transmitting said first and second carrier waves.

11. A television transmitter for producing signals representing picture information and accompanying sound information, including in combination, means for supplying a first carrier wave, oscillator means for generating a color controlling wave, counting means coupled to said oscillator means for altering the frequency of said color controlling wave by a predetermined amount to produce a sound carrier controlling wave, means coupled to said counting means for developing a sound carrier wave regulated in frequency by said controlling wave, a source of composite video signals including picture information and line and field synchronizing elements, means coupled to said source of composite video signals and to said oscillator means to incorporate portions of said color controlling wave with said video signals, modulator means to modulate said first carrier wave by said composite video signals, further modulator means coupled to said means for developing a sound carrier to modulate such carrier by sound signals, and means for transmitting said first carrier wave and said sound carrier wave.

12. A color television transmitter for producing signals representing color pictures and accompanying sound, including in combination, means for supplying a first carrier wave, oscillator means for generating a color controlling wave, means coupled to said oscillator means for increasing the frequency of said color controlling wave by a predetermined factor to produce a sound carrier controlling wave of higher frequency than that of said color controlling wave, means coupled to the last named means and to said means for supplying a first carrier wave for developing a sound carrier wave regulated in frequency by said controlling wave, a source of composite video signals including picture information and line and field synchronizing components, means coupled to said source of composite video signals and to said oscillator means to incorporate portions of said color controlling wave with said video signals, means for modulating said first carrier wave by said video signals, further means for modulating said sound carier wave by sound signals, and means for transmitting said first carrier wave and said sound carrier wave.

References Cited in the file of this patent

UNITED STATES PATENTS

| | | |
|---|---|---|
| 2,293,147 | Kell et al. | Aug. 18, 1942 |
| 2,546,972 | Chatterjea et al. | Apr. 3, 1951 |
| 2,586,957 | Keizer | Feb. 26, 1952 |
| 2,594,380 | Barton et al. | Apr. 29, 1952 |
| 2,653,187 | Luck et al. | Sept. 22, 1953 |
| 2,664,462 | Bedford | Dec. 29, 1953 |
| 2,678,348 | Ballard | May 11, 1954 |

OTHER REFERENCES

"Color Television," Wireless World, December 1950, pages 443–449.

"Recent Developments in Color Synchronization . . .," RCA Bulletins on Color Television and UHF, October 1949–July 1950, pages 1–11, published by RCA Laboratories Division.